June 1, 1943.   B. KREUZER   2,320,524
RERECORDING
Filed June 24, 1940   2 Sheets-Sheet 2
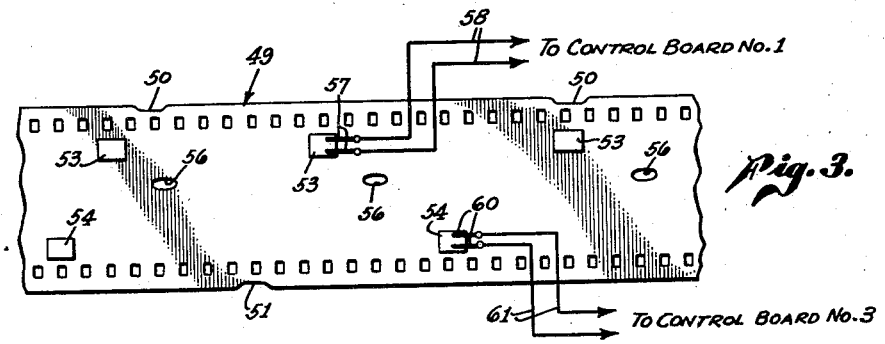
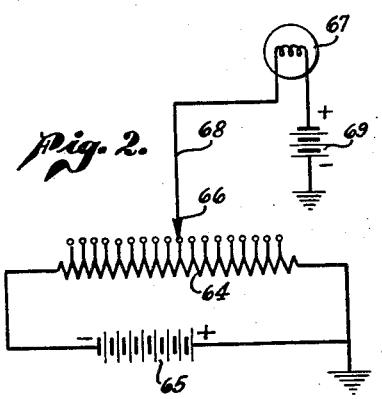
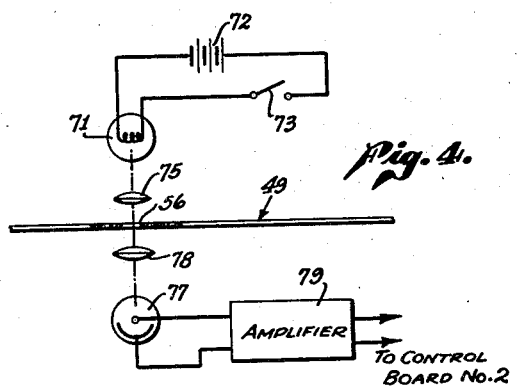
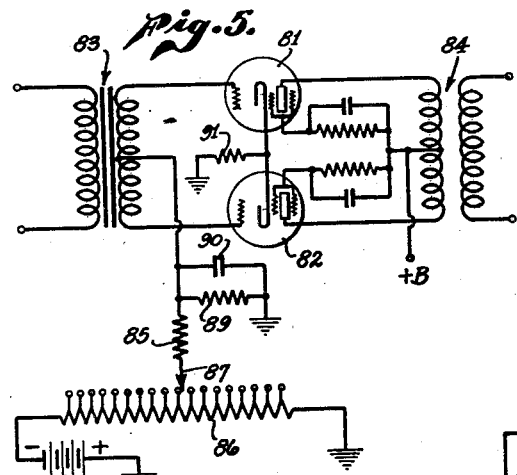
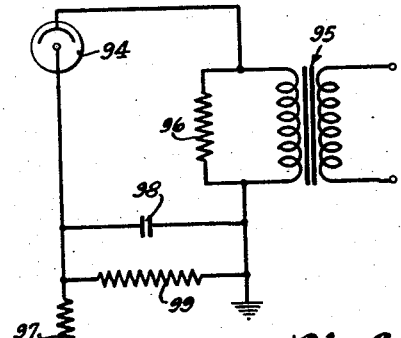
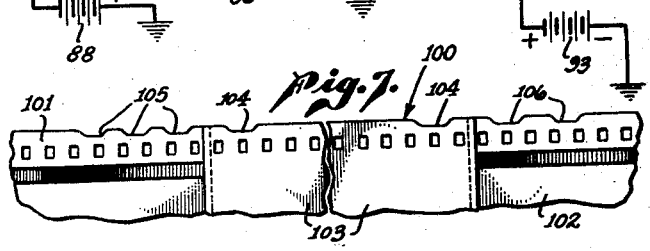
Inventor
BARTON KREUZER,
Attorney Patented June 1, 1943

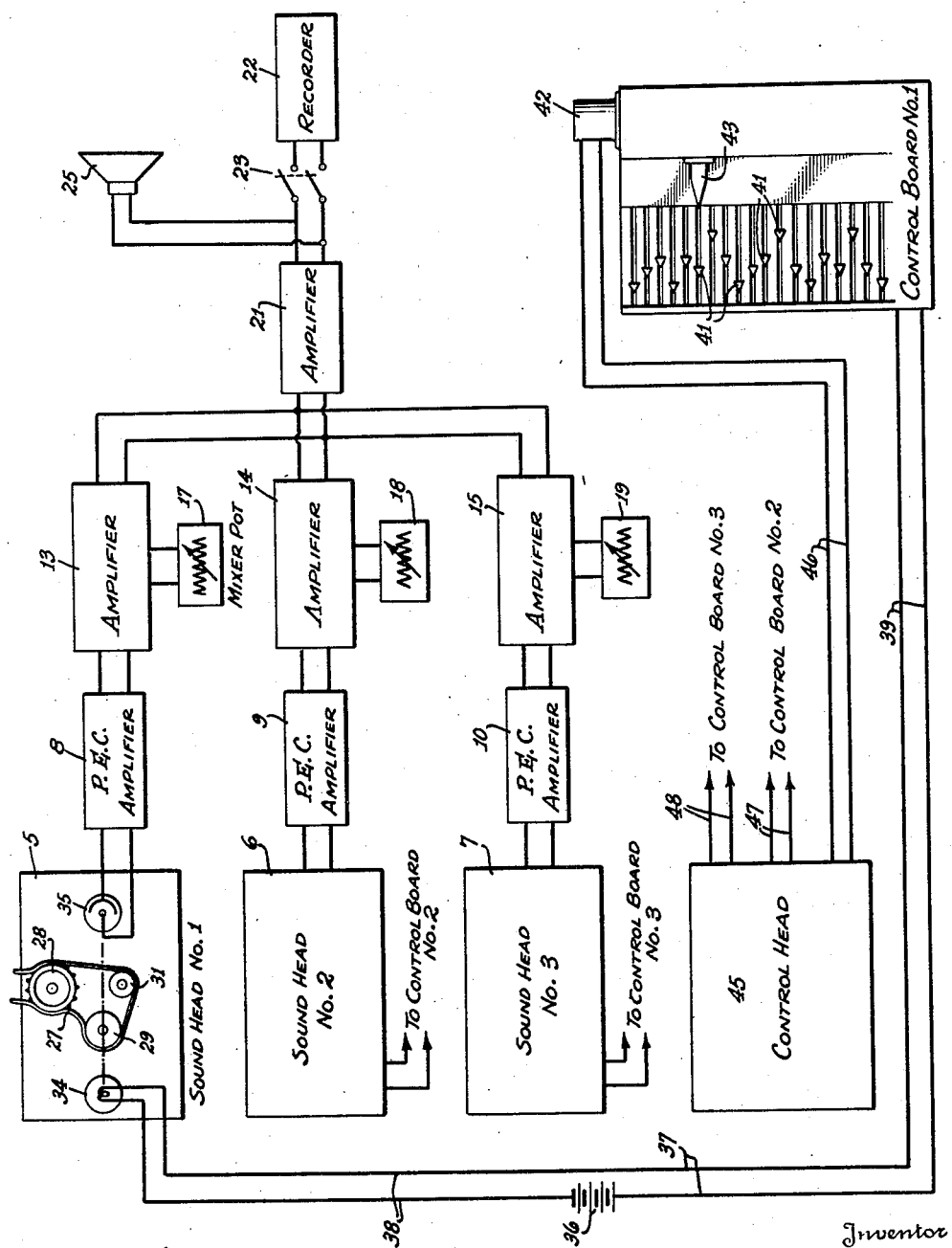

2,320,524

UNITED STATES PATENT OFFICE 2,320,524

RERECORDING

Barton Kreuzer, Los Angeles, Calif., assignor to Radio Corporation of America, a corporation of Delaware Application June 24, 1940, Serial No. 342,107

12 Claims. (Cl. 179—100.3)

This invention relates to apparatus and methods used in the production of sound motion pictures and particularly to the apparatus used in the rerecording of the sound track which is to accompany a picture.

It is well known in the art that motion pictures are made in a series of "takes" or sequences, the sound portion which finally accompanies the various sequences generally being rerecorded from several sources made either prior to, subsequent to, or at the time of the taking of the pictures. The usual procedure is to make a picture sequence and simultaneously therewith make a synchronized sound sequence which will be composed of the dialogue, if any, occurring in the scene. Where certain picture sequences are silent, sound in some form of a musical selection may be added to form a background for the action. Music may also be added to form a background for dialogue occurring in certain scenes. In many cases, sound effects, such as hoofbeats, crowd noises, thunder, and the like, may be added to sequences with and without dialogue. These background sound effects are generally taken from pre-recorded sound tracks and are "mixed" to make a final negative from which will be printed the combination picture and sound film suitable for theatre use.

The above procedure is known as rerecording, and is sometimes referred to as "duping" and "dubbing." Each individual sound track sequence, such as the dialogue, the background music, hoofbeats, etc., are joined together into respective reels, or rolls when less than a thousand feet, or in the form of individual continuous loops which are then run simultaneously and synchronously through separate reproducers or soundheads. The output of each soundhead is combined in a common circuit, monitored and recorded during the synchronous projection of a reel of the related picture sequences. An operator known as the "mixer" has in front of him on a panel a volume control for each of the sound reproducers. There may be one or more of these operators especially where three or more sound tracks are being combined. These mixers introduce the particular sound effect at the proper point and control the volume of each sound to obtain the proper coordination and dramatic effect. No matter how skilled the mixer, it is necessary to rehearse, and usually the greater the number of sound tracks being combined, the larger the number of rehearsals. A rehearsal consists of reproducing the related sound track during the simultaneous projection of the picture and varying the volume controls to obtain the best combination and coordination of the various sounds as indicated on a loudspeaker monitor system.

After the rehearsals have been made and the mixer and, perhaps, the director, who may be present, are satisfied that the last rehearsal will produce the desired combination effects, a sound recorder is connected to the common output circuit from the mixing panel, and the mixer attempts to repeat the last rehearsal while the sounds are recorded. However, as each rerecording rehearsal generally extends over the length of a roll or reel, it becomes extremely difficult to obtain an exact duplication of the last rehearsal. In most instances several portions of the final sound take may not compare in quality with that obtained during one or more of the rehearsals. Thus, it is either necessary to repeat the entire reel to correct or improve these poor portions of the sound recording and make an entire new recording, with the attendant chances of other errors, or let the sound track go out with a quality below that which is possible. Also, after a preview it may be necessary or at least desirable to rerecord a certain portion of a picture and the present invention permits this to be done expeditiously.

The present invention, therefore, is directed to a rerecording sound system wherein a control record may be made up prior to a rehearsal, the control record varying the outputs of the various soundheads in accordance with the general nature of the picture, dialogue and sound effects.

The rehearsal is then made, and during the rehearsal the mixer or sound director may suggest or independently vary the level of the various sound tracks. These additional variations or changes to the original log are then made on the control record and another rehearsal may be run, with perhaps another change here and there. With such a system of rehearsal control, it is possible to exactly duplicate or repeat a former rehearsal or thus to insure that the rerecorded sound track will exactly correspond to the last rehearsal. By saving the control track, a rerecording after a preview may be readily made.

The usual method of controlling the volumes of the various tracks being combined is by varying the transmission of the currents by means of variable attenuators. In its principal aspect, the present invention departs from this method of volume control by operating upon the exciter lamp in the soundhead reproducer. That is, the current to the lamp is varied, thus varying its brilliancy, which will increase or decrease the amount of light to the photoelectric cell and, consequently, the volume of the sound from any particular soundhead. This method of variation is particularly advantageous inasmuch as the increases and decreases are gradual due to the inherent thermo-inertia of the filament of incandescent exciter lamps. The control may operate through a resistance board similar to the type used in automatic printers of sound film wherein a control arrangement is provided whereby the printing lamp is varied in intensity in accordance with the density of the various sections of the negative being printed.

The principal object of the invention, therefore, is to improve the methods of and apparatus for rerecording film sound tracks.

Another object of the invention is to provide a predetermined control medium prior to a rehearsal of a sound track which will automatically control the volume of the sound track being reproduced.

A further object of the invention is to obtain a record of the variations in volume of a multiplicity of sound tracks being combined.

A further object of the invention is to automatically increase and decrease the sound volume of a rerecorded sound track gradually and uniformly.

A further object of the invention is to obtain a plurality of control tracks on a single control record.

A further object of the invention is to automatically vary the attenuation or gain of the transmission circuit intermediate the sound reproducer and sound recorder in a predetermined timed relationship.

Although the novel features which are believed to be characteristic of this invention are pointed out with particularity in the appended claims, the manner of its organization and the mode of its operation will be better understood by referring to the following description read in conjunction with the accompanying drawings forming a part thereof in which Figure 1 is a diagrammatic arrangement of a rerecording system embodying the invention;

Figure 2 is a detail view of the volume control circuit of the embodiment shown in Fig. 1;

Figure 3 is a fragmentary detail drawing of the control record employed in the invention;

Figure 4 is a detail view of a variation in the method of obtaining control impulses;

Figure 5 is a schematic detail view of a method of varying the transmission circuit in accordance with the invention;

Figure 6 is a schematic circuit detail view of another variation of a transmission circuit control; and Figure 7 is a fragmentary view of a reel or roll made up for rerecording purposes.

Referring now to Fig. 1, a plurality of soundheads 5, 6 and 7, it being understood that others may be similarly connected, are shown connected to photoelectric cell amplifiers 8, 9 and 10, respectively, which feed main transmission amplifiers 13, 14 and 15, respectively. The amplifiers 13, 14 and 15 have respective control potentiometers 17, 18 and 19, called "mixing pots," these pots usually being mounted on a control panel in front of the mixing operator. The outputs of the amplifiers 13, 14 and 15 are connected together and fed to an amplifier 21, the output of which may be impressed upon a recorder 22 when a switch 23 is closed, while a monitor loudspeaker 25 is connected to the circuit for rehearsal and monitoring purposes.

In the soundhead 5, called, for purposes of explanation, soundhead No. 1, the film path and translation portion of the system is shown diagrammatically. A film 27 having the sound track to be reproduced is fed from the left side of a sprocket 28 to a drum 29 and then is pulled by the right side of sprocket 28 around a roller 31. The sound track on the film 27 is translated into current variations by light from an exciter lamp 34 passing through the film to a photoelectric cell 35 connected to the photoelectric cell amplifier 8. The exciter lamp 34 is energized from a battery 36 over conductors 37, 38 and 39, the conductors being connected to a resistance control board designated as control board No. 1, for purposes of explanation. This control board may be of any of the usual commercial types such as manufactured for varying the printing light of motion picture printers, and the main elements of the board are shown as a plurality of resistance varying slides 41, a solenoid 42 and a gravity contactor 43. There will be such a control board for each of the soundheads.

A block 45 contains a control head for operating the respective control boards, conductors 46 being shown connected to the solenoid 42. Thus, each impulse over conductors 46 actuates the solenoid which causes the contactor 43 to drop to the next slide 41 and vary the brilliancy of lamp 34 in accordance with the setting of the particular slider contacted. The two pair of conductors 47 and 48 are shown for connection to control boards 2 and 3, respectively, similar to board No. 1. The control head 45 consists of a film driving apparatus of any standard type wherein the film is driven either at the same speed as the sound track films—namely, ninety feet a minute—or at a proportionately slower speed so that less control film is necessary.

Referring now to Fig. 3, a section 49 of such a control film is shown as a normal motion picture film which may be made up from old film leaders. It will be noted that this film has notches cut therein at 50 on one side of the film and at 51 on the other side of the film, these notches being adapted to operate any standard contact device well known in the art. Also positioned on the control film 49 are metallic patches 53 and 54 which may be of tin foil or other similar material. These patches may be glued or otherwise attached to the film. The row of patches 53 is positioned longitudinally of a certain portion of the film, while patches 54 are along another longitudinal portion of the film. There is also provided on the strip 49, for purposes of illustration, a series of holes 56 to illustrate another method of obtaining control impulses.

Connected so as to contact the patches 53 are two spring brushes 57 connected to conductors 58, while a similar pair of brushes 60 are adapted to contact patches 54, brushes 57 being connected to conductor 61. These elements are located in control head 45. Conductors 58 go to control board No. 1 and may correspond to conductors 46 in Fig. 1, while conductors 61 go to control board No. 3 and may correspond to conductors 48 in Fig. 1. Thus, as the film 49 is advanced synchronously with the various films 27 contained in the soundheads, the brushes 57 and 60 will contact the patches 53 and 54, respectively, in accordance with the position of the patches along the film. Upon contact of the brushes with the respective patches, an impulse will be transmitted to the selected solenoids, such as shown at 42 in Fig. 1, and will release the contactor 43 to drop to the next resistance adjustment. It is to be noted that sufficient space remains transversely of the film to accommodate other control tracks either of the nature of the patches 54 or by the use of holes 56, the operation of which will be explained later in connection with Fig. 4.

Referring now to Fig. 2, the control board No. 1 of Fig. 1 is shown as a variable-tapped resistance 64 connected to a potential supply 65, while the slider 43 is represented by the variable contact 66. It will be noted that the lamp 67 which corresponds to lamp 34 of Fig. 1 is energized over the resistance element 64, a conductor 68 and a battery 69, the battery 69 corresponding to battery 36 of Fig. 1. By this circuit, the variation of the slider 66 along the resistance 64 will, of course, vary the energy supply and, consequently, the brilliancy of the lamp 67 which, in turn, will vary the volume of the output of the particular soundhead in which the lamp 67 is situated. A simple series circuit employing only the battery 69 with the resistance 64 without battery 65 will serve as a means of obtaining energy variations to lamp 67.

Thus, in operation of the system, the mixer may study the picture and from his cue sheet, which is provided by the editors, make up a control record such as shown at 49 in Fig. 3, and position his patches 53, holes 56 or notches 50 and 51 according to the various sequences and the sound effects to be combined into the final sound record. This sound record is then placed in the control head 45 and the associated sound tracks are threaded in the various soundheads. The control board sliders 41 are also adjusted according to the amount of increase and decrease in volume desired at the points of variation. The system is then "rolled" and the mixer or others interested listen to the result, which is called a rehearsal. If it is found that the various sound effects are too loud at certain portions, or that they do not come in at the proper point in the picture or vary in volume in a suitable manner, a notation is made and then the control track is varied by removing the patches and replacing them in accordance with the new arrangement. If the position of the patch is correct, but the volume is not increased or decreased sufficiently, it is only necessary to vary the particular slider 41 to provide the proper volume level. In this manner it is realized that the control track 49 and the setting of the control boards provide a method of exactly duplicating a rehearsal, and when the switch 23 of Fig. 1 is closed to record the final result, it will exactly correspond to the approved rehearsal. Furthermore, the control track 49 is stored away and if, after cutting or editing or after a preview, there are disclosed certain undesirable sound sequences, these sequences may be rerecorded quickly by employing the original control record and modifying it to produce the new results desired. The usual cue sheet will also be referred to for indicating the desired volume levels.

Referring now to Fig. 4, there is shown a method of obtaining control impulses from a control track 49, in which the holes 56 are used. In this circuit an exciter lamp 71 is energized from a battery 72 when a switch 73 is closed. The light from the lamp 71 is impressed upon the film 49 by a lens 75, and the light emerging through the film is impressed upon a photoelectric cell 77 by a lens 76. The output of the photoelectric cell may be amplified in an amplifier 79 and then fed to the solenoid of a control board, such as board No. 75

2. With holes, an opaque film will be used, permitting light to pass through the holes 56 to operate the photoelectric cell. It is also to be understood that the film may be transparent, and opaque patches placed on the film at the proper points to remove the light from the cell 77, which, of course, will operate the relay, the control circuit being normally either open or closed. Similarly, the contactor operated by the notches 50 and 51 can operate a control board so that it is possible to provide a large number of control tracks on normal 35 mm. film, while wider strip material may be used for the control tracks. Thus, a control track may be a combination of metallic patches, holes and notches, or all of any one type of contact control elements. In each case, the appropriate type of contact-making device must be employed.

A mechanical contact device using punched film, such as shown in copending application Serial No. 335,739, filed May 17, 1940 (RCH—134) may also be employed as well as micro-switches used with printer control boards.

As explained above, volume control of the various sound tracks is accomplished by varying the intensity of the exciter lamps, and although this means of varying the volume is preferred because of the thermo-inertia of the filament of the lamps which provides an inherent gradual increase and decrease in volume, Figs. 5 and 6 illustrate a system for operating upon certain portions of the transmission circuit intermediate the soundhead and rerecorder.

In Fig. 5, a push-pull amplifying stage includes exponential or variable mu tubes 81 and 82 with their usual electrode elements and potential supplies. These tubes are fed through an input transformer 83 and have their output impressed upon an output transformer 84. This circuit portion may be one of the amplifying stages, preferably in one of the amplifiers 13, 14 and 15. Bias for the tubes 81 and 82 is obtained through the midpoint of the secondary of transformer 83 connected over a series resistance 85, a potential source 86, and a control board potentiometer resistance 86, for which a movable slider 87 is provided. Connected in shunt to this grid biasing circuit is a condenser 90 and a resistance 89 combination to provide timing for the grid variations in gain introduced by the control board slider 87 as it is adjusted along the resistance 86. Although resistances 85 and 89 and condenser 90 are the principal timing factors, the other circuit impedances determine the values of these elements since they have a timing effect. Thus, instead of the control board varying the current to an exciter lamp, as in Figs. 1 and 2, the grid biasing voltage is varied in an amplifying stage, and the transmission level is, therefore, increased or decreased accordingly. The control board resistance 86 may also be employed in place of the self-biasing resistance 91 and varied in the usual manner. By varying the values of the timing elements 85, 89 and 90, the rate of the increases and decreases in volume is controlled. Although a push-pull circuit is illustrated in Fig. 5, a single tube circuit may also be employed.

In Fig. 6, a control board resistance 92 polarized by a battery 93 is shown connected in the polarizing potential circuit for a photoelectric cell 94, this circuit including the primary of a transformer 95 shunted by a resistance 96, a series resistance 97 and principal timing elements comprising a condenser 98 and a resistance 99. In this variation of transmission control, the control board resistances indicated at 92 vary the potential on the photoelectric cell 94, thus varying the transmission or attenuation of the signal currents in accordance with the amount of resistance included in this circuit. To provide the necessary uniform or gradual increases or decreases in volume, the principal timing elements 97, 98 and 99 are provided, although element 96 and the normal circuit impedances are also effective. It will be realized that a combination of the controls of Figs. 1, 5 or 6 may also be employed.

The above-described apparatus is particularly suitable for a plurality of soundheads in which a separate control track, such as is shown at 49, is provided for controlling the different channels. This invention, however, contemplates using or employing modifications to the film which have the sound tracks thereon for operating the control boards, thus avoiding the use of an individual control track in certain instances.

In Fig. 7, a fragmentary section of a reel or roll to be rerecorded is shown wherein a sound track portion 101 is shown connected to a sound track portion 102 by a leader 103 shown broken, since the length of the leader is determined by the nature of the picture sequences. Such a rerecording reel or roll is generally made up of a plurality of sound sequences interconnected by blank leaders. This is particularly true for the dialogue track and certain types of sound effects, since these sounds are present for only certain periods during the picture. Thus, during the silent periods, a blank film of the proper length is positioned between the two sound dialogue sequences. Other reels may be similarly constructed for certain sound effects which occur at particular portions, such as when a radio is turned on to provide a certain definite program. Thus, before a rehearsal it is only necessary for the mixer to notch the sound film in the leader portion, such as shown at 104, so that the control board is operated at the proper time to bring in the sound, the leader being notched just subsequent to the sound sequence to eliminate this channel. If the sound is to be given an extended amount of increase, such as that accompanying the approach of an airplane over a considerable period of time greater than required for the exciter lamps to build up to their proper intensity, a series of notches such as shown at 105 and 106 may be provided along the sound track portion of the film carrying the track. This series of notches will increase or decrease the volume according to their placement and the corresponding adjustment of the resistance sliders. The notches will, of course, operate a contactor as described above.

This particular type of film may be used in conjunction with a system employing an individual control track, such as shown at 49, since the film 100 may be prepared prior to rehearsal with assurance that it will operate properly without additional modifications. With sound effects of the nature of crowd noises, film loops are usually employed, the reproduction therefrom, of course, being more readily controlled by the use of separate control tracks, as shown in Fig. 3.

The above system of volume variation control at predetermined points and in predetermined amounts may also be applied to correct for different average volume levels of the various sound sequences caused by different recording machines or conditions. With variable density sound tracks, this is usually done during the printing operation, but it may now be accomplished for both variable density and variable area sound tracks during the rerecording operation.

What I claim as my invention is:

1. In combination, means for generating a plurality of electrical currents corresponding to a corresponding number of signals, means individual to each of said signal currents for the transmission thereof, a plurality of units each having a plurality of volume control elements for individually varying the generating of each of said signal currents, and pre-constructed means for automatically connecting said elements one by one for controlling said generating means in accordance with a predetermined conception of what the relative amplitudes of said currents should be before any reproduction thereof.

2. A combination in accordance with claim 1 in which said generating means comprises a light source and means for varying the intensity of said source by said automatic means.

3. A combination in accordance with claim 1 in which said generating means comprises a light-sensitive device and means for varying the sensitivity of said device in accordance with said predetermined arrangement.

4. A combination in accordance with claim 1 in which said generating means includes means for predetermining the rate of variation of said generating means.

5. A rerecording sysetm comprising a plurality of sound reproducers for translating a plurality of sound records into a corresponding plurality of electriical currents, means for individually transmitting said currents, amplitude varying means for each of said sound record electrical currents, and control means adapted to control the period of reproduction of said respective currents and the amplitude of generation thereof, said control means being independent of said sound records and adapted to be manually modified from time to time to vary the time of reproduction of said respective sound records.

6. A rerecording system in accordance with claim 5 in which said control means comprises a previously prepared movable cue strip adapted to actuate said generating varying means in accordance with the cues thereon.

7. A rerecording system in accordance with claim 5 in which said generating means includes a source of light and a light sensitive device for each of said sound records and said control means includes means for varying the energy supply to said light source in accordance with the modifications to said control means.

8. A rerecording system in accordance with claim 5 in which said generating means comprises a source of light and a light sensitive device for each of said sound records, and said control means includes means for varying the sensitivity of said light sensitive device at a predetermined rate in accordance with the modifications to said control means.

9. A rerecording system comprising a sound record to be recorded, a reproducer for translating said record into corresponding electrical currents, said reproducer including a light source and a light sensitive device, a variable impedance element, an amplifying transmission circuit for said reproducers, a variable gain amplifier in said transmission circuit, changes in said impedance element varying the gain of said amplifier and correspondingly varying the amplitude of the currents in said transmission circuit, and a pre-constructed cue strip for selectively controlling the variations in said impedance element in accordance with a preconception of what the amplitude of said currents should be before any reproduction thereof.

10. A rerecording system in accordance with claim 9 in which means are provided for varying the gain of said amplifier at a predetermined rate.

11. A rerecording system comprising a sound record, a translator for changing said record to corresponding electrical currents, a transmission system for transmitting said currents, a unit including a plurality of volume control elements adapted to vary the amplitude of said currents, and a volume control record for connecting said volume control elements one by one to affect the amplitude of said currents in said transmission system.

12. A rerecording system in accordance with claim 11 in which are provided a plurality of said sound records, a corresponding plurality of said transmission systems, and a corresponding plurality of said volume control units, having respective volume control elements, said control record controlling the connection of the individual elements of each of said units for affecting the amplitude of the currents in each of said respective systems.

BARTON KREUZER.